United States Patent [19]
Stephens

[11] Patent Number: 5,460,425
[45] Date of Patent: Oct. 24, 1995

[54] GUTTER AND VISOR SYSTEM FOR A WINDOW OF A VEHICLE

[76] Inventor: Timothy M. Stephens, 3445 Jackson Rd., Mooresville, N.C. 28115

[21] Appl. No.: 303,632

[22] Filed: Sep. 9, 1994

[51] Int. Cl.⁶ ........................................................ B60J 1/20
[52] U.S. Cl. ............................................ 296/152; 296/154
[58] Field of Search ...................................... 296/152, 154, 296/213; D12/181, 183; 454/128, 131, 135; 160/44, DIG. 3, DIG. 4; 52/11, 74

[56] References Cited

U.S. PATENT DOCUMENTS

| | | | |
|---|---|---|---|
| 1,394,084 | 10/1921 | Gross | 160/DIG. 3 X |
| 3,612,453 | 10/1971 | Zimmer | 52/11 X |
| 5,251,953 | 10/1993 | Willey | 296/152 |

FOREIGN PATENT DOCUMENTS

| | | | |
|---|---|---|---|
| 156551 | 5/1954 | Australia | 296/154 |
| 2591951 | 6/1987 | France | 296/154 |
| 918689 | 2/1963 | United Kingdom | 296/152 |

*Primary Examiner*—Dennis H. Pedder

[57] ABSTRACT

A gutter and visor system positionable near a window of a vehicle comprising an elongated strip formed into an interior section, an exterior section, and an intermediate section therebetween; wherein the interior section is vertically positioned and includes an upper edge and a lower edge; wherein the exterior section is formed into a loop having an inboard portion and a free edge offset above and facing downward towards the inboard portion; wherein the intermediate section has an inboard portion coupled to the upper edge of the interior section and an outboard portion coupled to the inboard edge of the exterior section at a location offset from lower edge of the interior section; and coupling means for coupling the interior section near a window aperature on a vehicle.

8 Claims, 2 Drawing Sheets

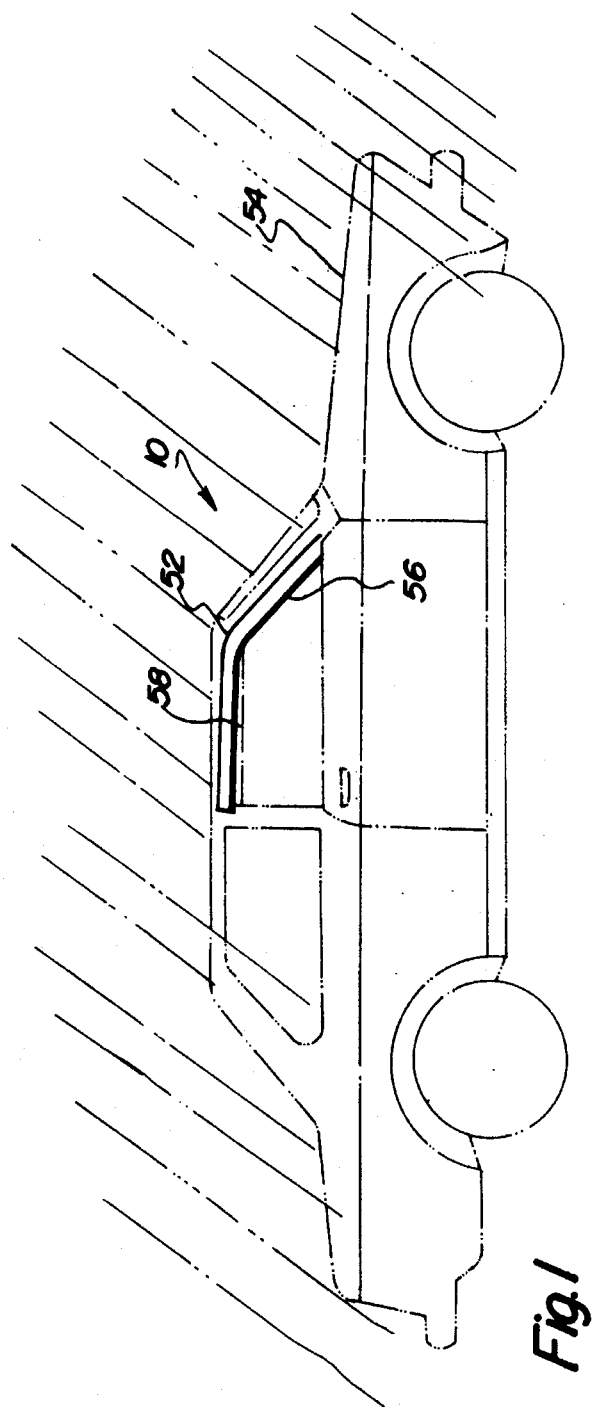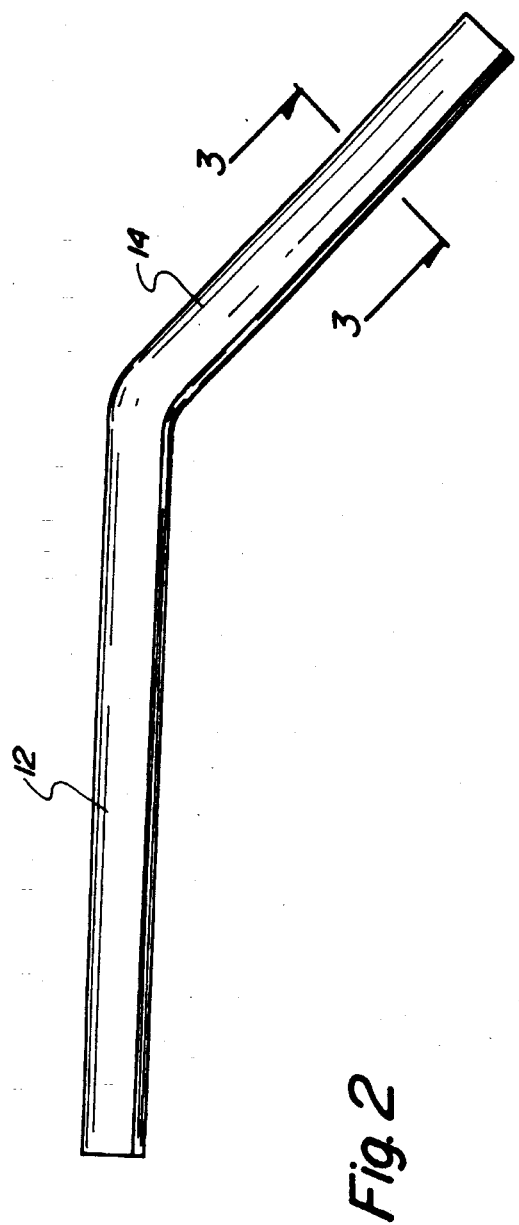

GUTTER AND VISOR SYSTEM FOR A WINDOW OF A VEHICLE

BACKGROUND OF THE INVENTION

1. Field of the Invention

The present invention relates to a gutter and visor system for a window of a vehicle and more particularly pertains to enabling a person sitting by a window of a vehicle to open the window a portion and be shielded from rain during rainy conditions and further enabling a person sitting by a window of a vehicle to be shielded from sunlight during sunny conditions with a gutter and visor system for a window of a vehicle.

2. Description of the Prior Art

The use of vehicle visors is known in the prior art. More specifically, vehicle visors heretofore devised and utilized for the purpose of preventing exposure to rain or sun through a side window of a vehicle are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,468,062 to Marcus et al. discloses a side window visor. U.S. Pat. No. 4,792,177 to Svensson discloses a sun visor for a vehicle side window. U.S. Pat. No. 4,844,530 to Mahler et al. discloses a sun visor for mounting above a side window in a vehicle. U.S. Pat. No. 5,118,157 to Tamura discloses an apparatus for preventing water droplets from attaching to a vehicle side window. U.S. Pat. No. 5,139,302 to Kanke discloses window molding for automotive vehicles.

While these devices fulfill their respective, particular objective and requirements, the aforementioned patents do not describe a gutter and visor system for a window of a vehicle that enables a person sitting by a window of a vehicle to open the window a portion and be shielded from rain during rainy conditions and further enables a person sitting by a window of a vehicle to be shielded from sunlight during sunny conditions though the use of a unique integral sloping roof and gutter structure.

In this respect, the gutter and visor system for a window of a vehicle according to the present invention substantially departs from the conventional concepts and designs of the prior art, and in doing so provides an apparatus primarily developed for the purpose of enabling a person sitting by a window of a vehicle to open the window a portion and be shielded from rain during rainy conditions and further enabling a person sitting by a window of a vehicle to be shielded from sunlight during sunny conditions.

Therefore, it can be appreciated that there exists a continuing need for new and improved gutter and visor system for a window of a vehicle which can be used for enabling a person sitting by a window of a vehicle to open the window a portion and be shielded from rain during rainy conditions and further enabling a person sitting by a window of a vehicle to be shielded from sunlight during sunny conditions. In this regard, the present invention substantially fulfills this need.

SUMMARY OF THE INVENTION

In the view of the foregoing disadvantages inherent in the known types of vehicle visors now present in the prior art, the present invention provides an improved gutter and visor system for a window of a vehicle. As such, the general purpose of the present invention, which will be described subsequently in greater detail, is to provide a new and improved gutter and visor system for a window of a vehicle and method which has all the advantages of the prior art and none of the disadvantages.

To attain this, the present invention essentially comprises, in combination, an elongated strip of smoke acrylic formed with a horizontal back leg and an integral front leg extended downwards therefrom to define an obtuse angle between the legs. The strip is further formed into an interior section, an exterior section, and an intermediate section therebetween. The interior section is vertically positioned and includes an upper edge, a lower edge, and an inboard surface and an outboard surface located between the edges. The interior section has a thickness of about 0.5 inch ±10%. The exterior section is formed into a loop having an inboard portion and a free edge offset above and facing downward towards the inboard portion. The intermediate section has an inboard portion integrally coupled to the upper edge of the interior section and an outboard portion integrally coupled to the inboard portion of the exterior section at a location offset beneath the lower edge of the interior section. The intermediate section further includes a downwardly curved concave form. The intermediate section has a width of 1.5 inches ±10% as defined between the inboard portion thereof to the outboard portion thereof. The exterior section creates a gutter for channeling water away from the strip and the intermediate section creates a roof for transferring water impinging thereupon to the gutter. The intermediate section and exterior section creates a visor for blocking the direct transmission of sunlight. A space is defined between the interior section and exterior section whose extent as measured perpendicularly outwards from the outboard surface of the interior section to the free edge of the exterior section is 2.25 inches ±10%. Lastly, a strip of double-sided adhesive tape is included and has an outboard face coupled to the inboard surface of the interior section and an inboard face adapted to be coupled above and adjacent to a periphery of a window aperature on a vehicle, whereby the interior section of the front leg is coupleable above and adjacent to a front edge of the window aperature and the interior section of back leg is coupleable above and adjacent to a top edge of a window aperature.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved gutter and visor system for a window of a vehicle which has all the advantages of the prior art vehicle visors and none of the disadvantages.

It is another object of the present invention to provide a new and improved gutter and visor system for a window of a vehicle which may be easily and efficiently manufactured and marketed.

It is a further object of the present invention to provide a new and improved gutter and visor system for a window of a vehicle which is of durable and reliable construction.

An even further object of the present invention is to provide a new and improved gutter and visor system for a window of a vehicle which is susceptible of a low cost of manufacture with regard to both materials and labor, and which accordingly is then susceptible of low prices of sale to the consuming public, thereby making such a gutter and visor system for a window of a vehicle economically available to the buying public.

Still yet another object of the present invention is to provide a new and improved gutter and visor system for a window of a vehicle which provides in the apparatuses and methods of the prior art some of the advantages thereof, while simultaneously overcoming some of the disadvantages normally associated therewith.

Even still another object of the present invention is to provide a new and improved gutter and visor system for a window of a vehicle for enabling a person sitting by a window of a vehicle to open the window a portion and be shielded from rain during rainy conditions and further enabling a person sitting by a window of a vehicle to be shielded from sunlight during sunny conditions.

Lastly, it is an object of the present invention to provide a new and improved gutter and visor system for a window of a vehicle comprising an elongated strip formed into an interior section, an exterior section, and an intermediate section therebetween; wherein the interior section is vertically positioned and includes an upper edge and a lower edge; wherein the exterior section is formed into a loop having an inboard portion and a free edge offset above and facing downward towards the inboard portion; wherein the intermediate section has an inboard portion coupled to the upper edge of the interior section and an outboard portion coupled to the inboard portion of the exterior section at a location offset from lower edge of the interior section; and coupling means for coupling the interior section near a window aperature on a vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side-elevational view of the preferred embodiment constructed in accordance with the principles of the present invention secured adjacent to a window aperature on a side of a vehicle.

FIG. 2 is a side-elevational view of the present invention.

The same reference numerals refer to the same parts through the various Figures.

DESCRIPTION OF THE PREFERRED EMBODIMENT

Figure 3:
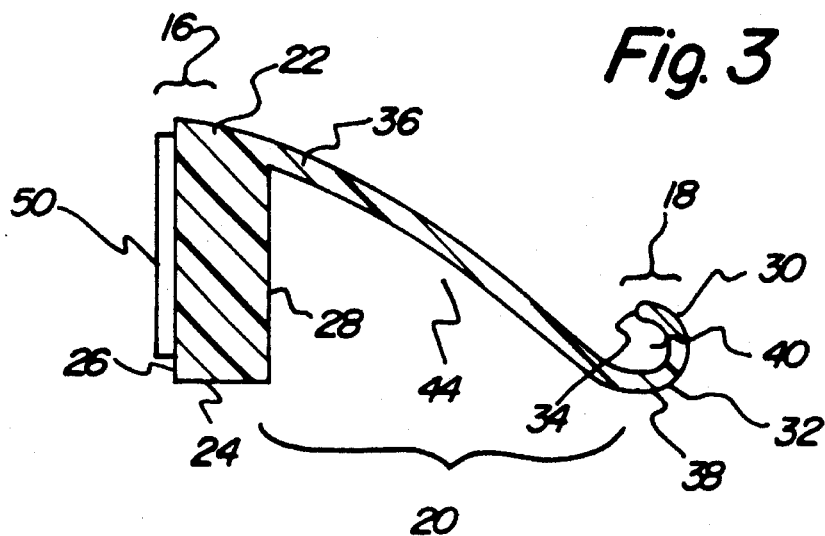
FIG. 3 is a cross-sectional view of the present invention taken along the line 3—3 of FIG. 2.

With reference now to the drawings, and in particular, to FIGS. 2 and 3 thereof, the preferred embodiment of the new and improved gutter and visor system for a window of a vehicle embodying the principles and concepts of the present invention and generally designated by the reference number 10 will be described.

Specifically, the present invention includes two major components. The major components are the acrylic strip and the tape strip. These components are interrelated to provide the intended function.

More specifically, it will be noted in the various Figures that the first major component is the acrylic strip. In the preferred embodiment, the acrylic material is smoked. Other elastomeric materials may also be utilized such as rubber. With respect to a longitudinal direction defined along a side of a vehicle from its back to its front, the acrylic strip is formed with a horizontal back leg 12 and an integral front leg 14 extended downwards therefrom to thereby define an obtuse angle between the legs. The angle formed between the front leg and back leg is dependent mainly upon the angle of a window aperture on a vehicle between its top edge and its front edge. This angle is usually between about 95 degrees and 160 degrees. With respect to a transverse direction defined perpendicularly outwards from a side of a vehicle, the strip is further formed into an interior section 16, an exterior section 18, and an intermediate section 20 therebetween. The interior section is vertically positioned for coupling with a side, rear, or front of a vehicle. The interior section includes an upper edge 22 and a lower edge 24 as well as an inboard surface 26 and an opposed outboard surface 28. The inboard surface and outboard surface are located between the lower edge and upper edge. The interior section has a thickness of about 0.5 inch ±10% as measured perpendicularly from the inboard surface to the outboard surface. The exterior section is formed into a loop 30. The loop has an inboard portion 32 and a free edge 34 offset above and facing downward towards the inboard portion. In this configuration, a small slot is created between the free edge and the inboard portion for collecting water. The intermediate section has an inboard portion 36 integrally coupled to the upper edge of the interior section and an outboard portion 38 integrally coupled to the inboard portion of the exterior section at a location offset beneath the lower edge 24 of the interior section. The intermediate section further has a downwardly curved concave form. The intermediate section has a width of 1.5 inches ±10% as defined between the inboard portion thereof to the outboard portion thereof in a generally transverse direction along the upper surface thereof. The exterior section creates a gutter 40 for channeling water away from the strip. The intermediate section creates a roof 42 for transferring water impinging thereupon through the slot to the gutter. The intermediate section 20 and the exterior section 18 create a visor for blocking the direct transmission of sunlight that is directed towards a window aperture of a vehicle. Furthermore, a space is defined between the interior section and exterior section. The extent of this space as measured perpendicularly and transversely from the outboard surface of the interior section to the free edge of the exterior section is 2.25 inches ±10%.

The second major component is the tape strip 50. The tape strip has an outboard face with a layer of adhesive disposed thereon. The outboard face is coupled to the inboard surface 26 of the interior section. The tape strip also has an inboard face with a layer of adhesive disposed thereon. The inboard face is adapted to be coupled above and adjacent to a periphery 52 of a window aperture of a vehicle 54. The interior section 16 of the front leg 14 is thereby coupleable above and adjacent to a front edge 56 of a window aperture of a vehicle. The interior section 16 of the back leg 12 is thereby coupleable above and adjacent to a top edge 58 of a window aperture of a vehicle. In this position, the present invention may perform its shielding and shading functions.

Figure 4:
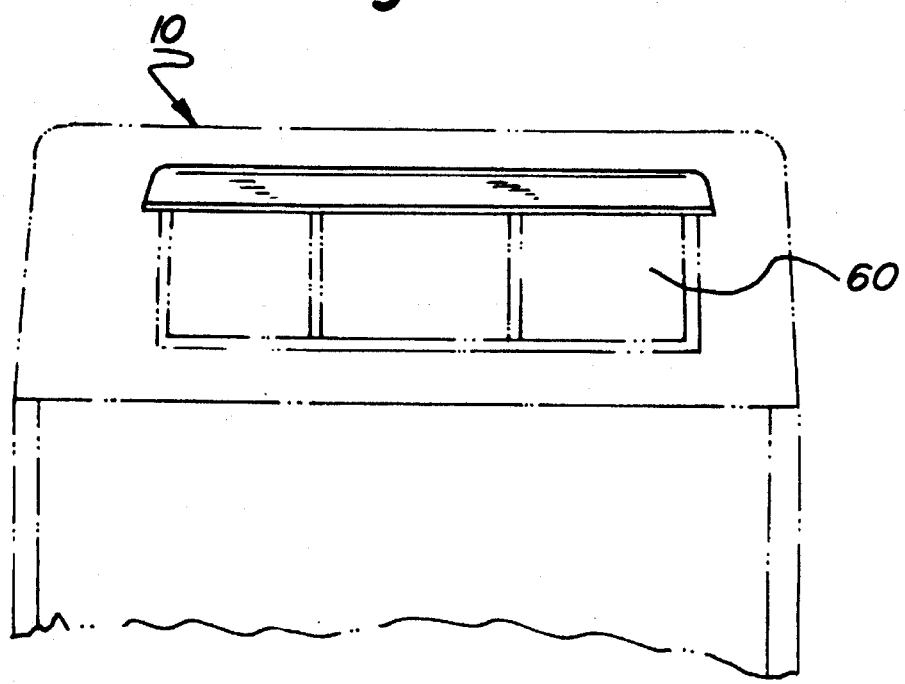
FIG. 4 is side elevational view an alternate embodiment of the present invention secured above and adjacent to a sliding rear window of a vehicle.

A second embodiment of the present invention is shown in FIG. 4. This embodiment includes substantially all of the components of the present invention except that it is formed in a linear configuration without legs. In this configuration, the second embodiment is coupleable above a sliding rear window 60 of a vehicle for performing its shielding and shading functions.

The present invention is used on the outside of a vehicle's windows to prevent rain from entering when the windows are down. The present invention consists of a strip of smoke acrylic material. It may also be formed in a variety of different colors such as red, black, blue, green, hot pink and clear. The present invention is shaped to fit around the outer frame of a vehicle's side door and window. A strip of double-sided adhesive tape is used to attach the interior section to the vehicle. The exterior section of the present invention is attached to the interior section at an angle so that there is a space of about 2.25 inches between the bottom edge of the interior section and the loop of the exterior section. The present invention could be produced in different lengths and shapes to accommodate any type of vehicle window.

When it is raining, a driver or passenger can roll down a window at least a few inches without rain coming in. This is because of the width and unique design of the present invention. Prior art visors and rain shields extend from a vehicle only about a distance of about 0.75 inch. This proves insufficient to prevent rain from entering a vehicle. Furthermore prior art designs do not employ the roof and gutter combination of the present invention for diverting water away from an opening of a window of a vehicle. Thus, the present invention enables a window to be opened lower than is possible with prior art rain visors. The present invention provides about 50–75% more down window space during most rainy periods without water dripping or pouring into the interior of a vehicle. The present invention could be used on almost all trucks and vehicles. Furthermore, it can be utilized on sliding back rear windows. The present invention may also be used on 18-wheel tractor trailer trucks.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A gutter and visor system for enabling a person sitting by a window of a vehicle to open the window a portion and be shielded from rain during rainy conditions and further enabling a person sitting by a window of a vehicle to be shielded from direct sunlight during sunny conditions comprising, in combination:

- an elongated strip of smoke acrylic formed with a horizontal back leg and an integral front leg extended downwards therefrom to define an obtuse angle between the legs, the strip further formed into an interior section, an exterior section, and an intermediate section therebetween;
- wherein the interior section is vertically positioned and includes an upper edge, a lower edge, and an inboard surface and an outboard surface located between the edges;
- wherein the interior section has a thickness of about 0.5 inch ±10%;
- wherein the exterior section is formed into a loop having an inboard portion and a free edge offset above and facing downward towards the inboard portion;
- wherein the intermediate section has an inboard portion integrally coupled to the upper edge of the interior section and an outboard portion integrally coupled to the inboard portion of the exterior section at a location offset beneath the lower edge of the interior section, the intermediate section further having a downwardly curved concave form;
- wherein the intermediate section has a width of 1.5 inches ±10% as defined between the inboard portion thereof to the outboard portion thereof;
- wherein the exterior section creates a gutter for channeling water away from the strip and the intermediate section creates a roof for transferring water impinging thereupon to the gutter;
- wherein the intermediate section and exterior section creates a visor for blocking the direct transmission of sunlight;
- wherein a space is defined between the interior section and exterior section whose extent as measured perpendicularly outwards from the outboard surface of the interior section to the free edge of the exterior section is 2.25 inches ±10%; and a strip of double-sided adhesive tape having an outboard face coupled to the inboard surface of the interior section and an inboard face adapted to be coupled above and adjacent to a periphery of a window aperture on a vehicle, whereby the interior section of the front leg is coupleable above and adjacent to a front edge of the window aperture and the interior section of the back leg is coupleable above and adjacent to a top edge of a window aperture.

2. A gutter and visor system positionable near a window of a vehicle comprising:

an elongated strip formed into an interior section, an exterior section, and an intermediate section therebetween;

wherein the interior section is vertically positioned and includes an upper edge and a lower edge;

wherein the exterior section is formed into a loop having an inboard portion and a free edge offset above and facing downward towards the inboard portion;

wherein the intermediate section has an inboard portion coupled to the upper edge of the interior section and an outboard portion coupled to the inboard portion of the exterior section at a location offset from lower edge of the interior section; and coupling means for coupling the interior section near a window aperture on a vehicle.

3. The gutter and visor system as set forth in claim 2 wherein the strip is further formed with a horizontal back leg and an integral front leg extended downwards therefrom.

4. The gutter and visor system as set forth in claim 2 wherein the interior section has a thickness of about 0.5 inch ±10%.

5. The gutter and visor system as set forth in claim 2 wherein the intermediate section has a width of 1.5 inches ±10% as defined between the inboard portion thereof to the outboard portion thereof.

6. The gutter and visor system as set forth in claim 2 wherein a space is defined between the interior section and exterior section whose extent as measured perpendicularly outwards from the outboard surface of the interior section to the free edge of the exterior section is 2.25 inches ±10%.

7. The gutter and visor system as set forth in claim 2 wherein the intermediate section further has a downwardly curved concave form.

8. The gutter and visor system as set forth in claim 2 wherein the coupling means is a strip of double-sided adhesive tape.

* * * * *